US012559055B2

(12) United States Patent
Abe et al.

(10) Patent No.:  US 12,559,055 B2
(45) Date of Patent:  Feb. 24, 2026

(54) VEHICULAR AIRBAG DEVICE

(71) Applicant: Autoliv Development AB, Vargarda (SE)

(72) Inventors: Kazuhiro Abe, Kanagawa (JP); Keitoku Miyagi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/572,895

(22) PCT Filed: Jun. 3, 2022

(86) PCT No.: PCT/JP2022/022673

§ 371 (c)(1),
(2) Date: Dec. 21, 2023

(87) PCT Pub. No.: WO2023/276557

PCT Pub. Date: Jan. 5, 2023

(65) Prior Publication Data

US 2024/0286574 A1      Aug. 29, 2024

(30) Foreign Application Priority Data

Jun. 30, 2021    (JP) ................................. 2021-109515

(51) Int. Cl.
B60R 21/231       (2011.01)
B60R 21/203       (2006.01)
        (Continued)

(52) U.S. Cl.
CPC .......... B60R 21/231 (2013.01); B60R 21/203 (2013.01); B60R 21/235 (2013.01);
        (Continued)

(58) Field of Classification Search
CPC ... B60R 21/231; B60R 21/203; B60R 21/235; B60R 21/2338; B60R 2021/23382; B60R 2021/23542; D03D 1/02
        (Continued)

(56) References Cited

U.S. PATENT DOCUMENTS

2002/0020998 A1*  2/2002  Keshavaraj ........... B60R 21/231
                                                      280/743.1
2022/0306037 A1*  9/2022  Suzuki ................ B60R 21/2035

FOREIGN PATENT DOCUMENTS

JP        48-087533 A      11/1973
JP        7-117599 A       5/1995
        (Continued)

*Primary Examiner* — Keith J Frisby
(74) *Attorney, Agent, or Firm* — Harness, Dickey & Pierce, P.L.C.; Ryan W. Massey; Colleen Shovlin

(57)                ABSTRACT

A vehicular airbag device that comprises: an inflator; and an airbag cushion that inflates and deploys between a steering wheel and an occupant. The airbag cushion includes: an occupant-side panel that deploys to the occupant side and restrains the occupant; a vehicle-side panel that is disposed on the opposite side to the occupant-side panel; and side panels that connect the occupant-side panel and the vehicle-side panel and constitute the side surfaces of the airbag cushion. The side panels comprise a plurality of subpanels. A base material weft that constitutes a central section E1 of the sub-panels extends in a virtual plane S2 that follows the occupant side of the rim of a steering wheel when the airbag cushion is inflated and deployed.

7 Claims, 14 Drawing Sheets

(51) Int. Cl.
 *B60R 21/235* (2006.01)
 *D03D 1/02* (2006.01)
 *B60R 21/2338* (2011.01)

(52) U.S. Cl.
 CPC ............ *D03D 1/02* (2013.01); *B60R 21/2338*
 (2013.01); *B60R 2021/23382* (2013.01); *B60R*
 *2021/23542* (2013.01)

(58) Field of Classification Search
 USPC ......................................................... 280/731
 See application file for complete search history.

(56) References Cited

FOREIGN PATENT DOCUMENTS

| JP | 11-334509 | A | | 12/1999 |
|----|-----------|---|---|---------|
| JP | 2004-506571 | A | | 3/2004 |
| JP | 2018-20737 | A | | 2/2018 |
| JP | 2018020737 | A | * | 2/2018 |
| JP | 2018203213 | A | * | 12/2018 |
| JP | 2019038449 | A | * | 3/2019 |
| JP | 2019-142338 | A | | 8/2019 |
| WO | 2020/035994 | A1 | | 2/2020 |

* cited by examiner

242
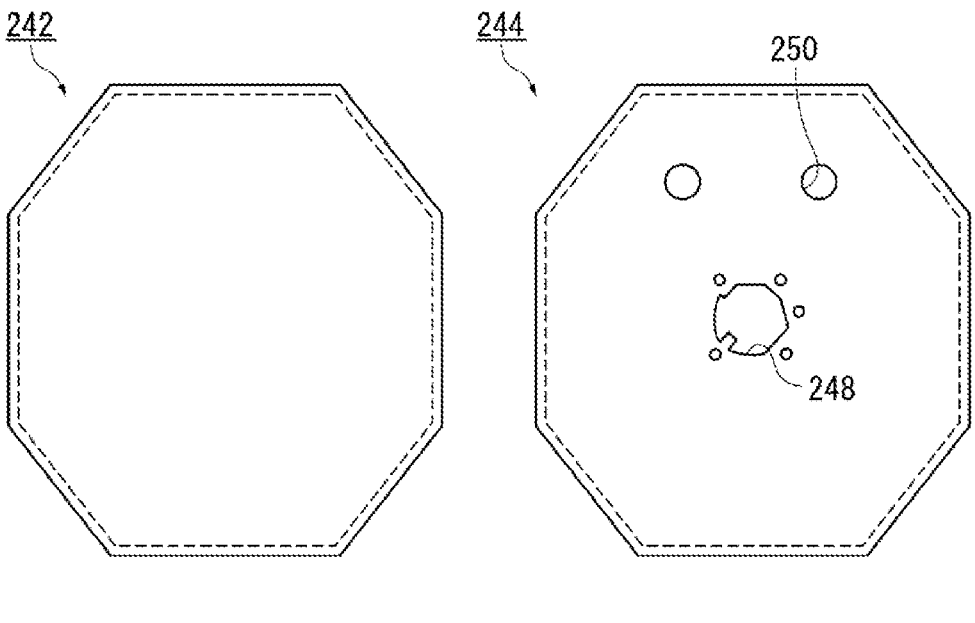
FIG. 13A          FIG. 13B
246
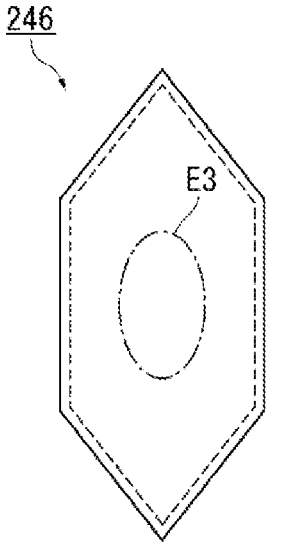
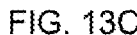
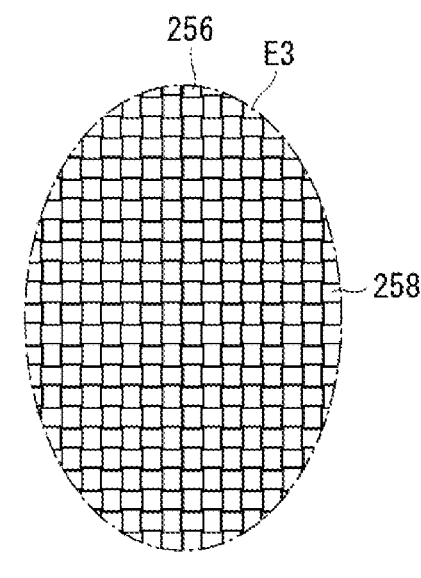
FIG. 13C          FIG. 13D

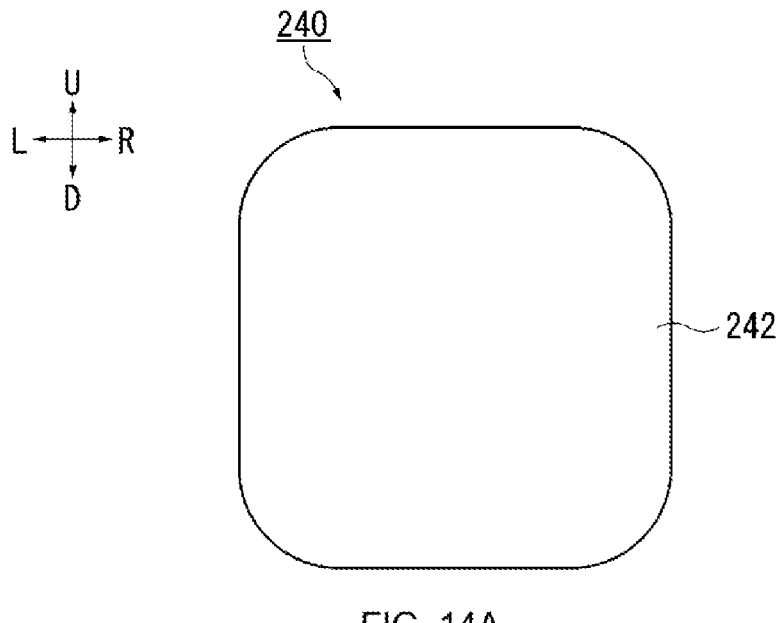
FIG. 14A
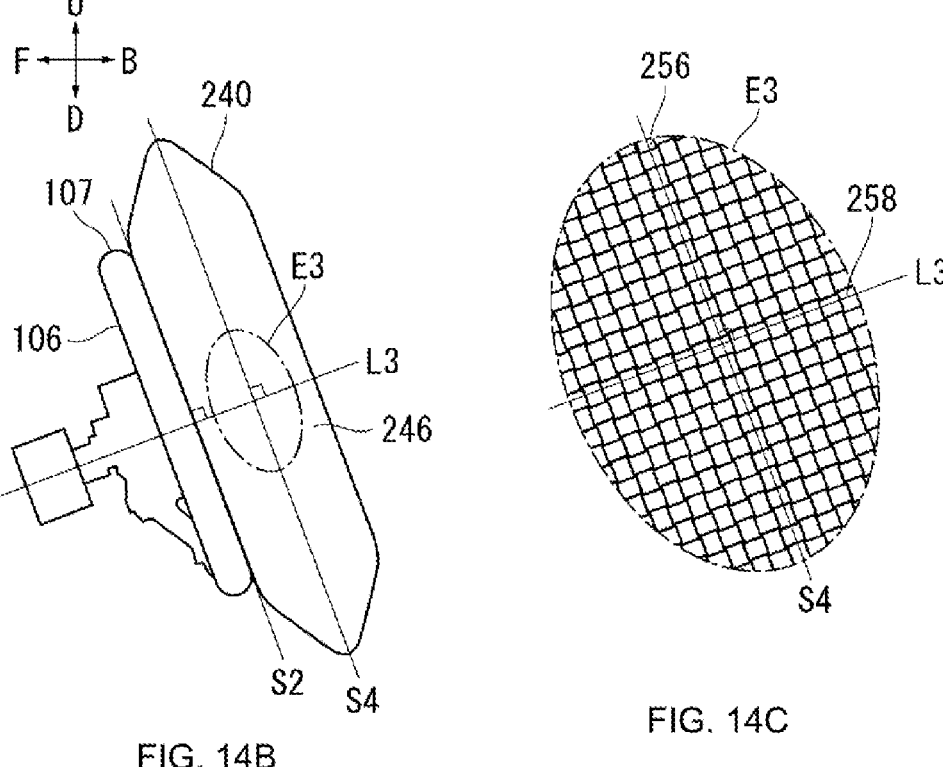
FIG. 14B
FIG. 14C

VEHICULAR AIRBAG DEVICE

TECHNICAL FIELD

The present invention relates to a vehicle airbag device for restraining an occupant in an emergency.

BACKGROUND ART

Airbag devices have generally become standard equipment in vehicles in recent years. An airbag device is a safety device which is operated in the event of an emergency such as a vehicle collision, retaining and protecting occupants utilizing an airbag cushion which expands and deploys based on gas pressure.

There are various types of airbag devices depending on the installation site and application. For example, a front airbag is provided in the center of the steering wheel in front of the driver seat primarily to protect an occupant in a front seat and a passenger airbag is provided in the instrument panel or nearby location near the passenger seat. Additionally, side airbags that expand and deploy to the side of the occupant from the side part of the seat and curtain airbags and the like that expand and deploy from above the side window inside the vehicle cabin for protecting the occupant from a side collision or a rollover crash are known.

Patent Document 1 discloses a driver seat airbag device as an example of an airbag device for protecting the occupant of a front seat. With the technology of Patent Document 1, as described in FIG. 7 and the like, an airbag 10 is trapezoidal in shape enabling restraining the occupant using a broad front panel 12.

RELATED ART DOCUMENTS

Patent Documents

Patent Document 1: Japanese Unexamined Patent Application 2018-20737

SUMMARY OF THE INVENTION

Currently demands are being placed on airbag devices to support irregular collisions such as collisions from a diagonal longitudinal direction relative to the vehicle, or so-called oblique collisions. During an oblique collision, the occupant enters an airbag cushion existing in front of the seat at an irregular angle, such as in an oblique direction or the like. Here, if the occupant's head comes into contact with the airbag cushion that is in front of the seat, there are cases where the head rotates with the neck as an axis, as viewed from above. From the perspective of a human body structure, this type of rotation of the head is a cause that can raise the injury level of the occupant and so there is desire to prevent this in an effective manner.

With the technology of Patent Document 1, in addition to increasing the size of a front panel 12, the direction of threads are intentionally mismatched between the side panel pieces 13a to 13c and the front panel 12 to enable uniform deployment of the airbag 10. However, from the viewpoint of suppressing injury value of the occupant, there is room for improvement of the technology in Patent Document 1.

Problem to be Solved by the Invention

In light of this type of issue, an objective of the present invention is to provide a vehicle airbag that suppresses injury value of the occupant.

Means for Solving the Problem

To resolve the problem described above, a vehicle airbag device according to the present invention includes:
an inflator installed in a steering wheel of a vehicle; and
an airbag cushion in a bag shape that receives gas from the inflator that expands and deploys between the steering wheel and an occupant in a driver seat; wherein
the airbag cushion includes:
an occupant side panel that deploys on the occupant side for restraining the occupant,
a vehicle side panel installed on the side opposite the occupant side panel, and
a side panel that connects the occupant side panel and the vehicle side panel and constitutes the side surface of the airbag cushion,
the side panel is a plurality of sub-panels combined, and
of the warp and the weft threads, a first of the threads of the base cloth that constitutes an area at a center of the sub-panel extends parallel to a virtual plane along the occupant side of a rim of the steering wheel during expansion and deployment of the airbag cushion.

With the configuration described above, aligning the direction of the cloth grains of each sub-panel enables evenly distributing the force when the airbag cushion expands and the force received when restraining the occupant, to the extent possible. Therefore, deviation of the reaction force applied to the occupant from the occupant side panel can be suppressed which, for example, suppresses application of an unintentional rotational force to the head of the occupant; thereby reducing an injury value of the occupant.

A second of the weft and warp described above should extend in a direction that is orthogonal to that of the first. This configuration also suppresses deviation of reaction force applied to the occupant by the occupant side panel enabling reducing injury value of the occupant.

The side panel described above may be arcuate in shape and the arcuate side panel may be divided into a plurality of sub-panels in the circumferential direction.

The configuration described above enables distributing the force for restraining the occupant and the like between each sub-panel to the extent possible so deviation of the reaction force applied to the occupant from the occupant side panel is suppressed and injury value to the occupant can be reduced.

The sub-panel described above may be trapezoidal with a lower base that is longer than an upper base on the occupant side panel side. This configuration also enables distributing the force for restraining the occupant and the like between each sub-panel to the extent possible so deviation of the reaction force applied to the occupant from the occupant side panel is suppressed and injury value to the occupant can be reduced.

The sub-panel described above may be an annular fan shape with a large arc on the occupant side panel side. This configuration also enables distributing the force for restraining the occupant and the like between each sub-panel to the extent possible so deviation of the reaction force applied to the occupant from the occupant side panel is suppressed and injury value to the occupant can be reduced.

The plurality of sub-panels include at least two sub-panels arranged at facing locations of the side surfaces of the airbag cushion, wherein the two sub-panels have a poly-sided shape with six or more sides, and the occupant side panel and the vehicle side panel are joined together directly at locations other than the side panels.

The configuration described above enables distributing the force for restraining the occupant and the like between each sub-panel to the extent possible so deviation of the reaction force applied to the occupant from the occupant side panel is suppressed and injury value to the occupant can be reduced.

The poly-sided shape sub-panel described above may be a hexagonal shape. This configuration also enables distributing the force for restraining the occupant and the like between each sub-panel to the extent possible so deviation of the reaction force applied to the occupant from the occupant side panel is suppressed and injury value to the occupant can be reduced.

The two sub-panels described above may be provided on left and right opposing sides of the airbag cushion as viewed from an occupant properly sitting in the driver seat.

The configuration described above enables distributing the force for restraining the occupant and the like between each sub-panel to the extent possible so deviation of the reaction force applied to the occupant from the occupant side panel is suppressed and injury value to the occupant can be reduced.

The two sub-panels described above may be provided on upper and lower opposing sides of the airbag cushion as viewed from an occupant properly sitting in the driver seat.

The configuration described above enables distributing the force for restraining the occupant and the like between each sub-panel to the extent possible so deviation of the reaction force applied to the occupant from the occupant side panel is suppressed and injury value to the occupant can be reduced.

Effect of the Invention

With the present invention, a vehicle airbag device that enables suppressing injury value of the occupant can be provided.

BRIEF DESCRIPTION OF THE DRAWINGS

FIG. 5 is a diagram depicting the airbag cushion of FIG. 1B and an occupant seated in a seat.

FIGS. 9A, 9B, and 9C are diagrams respectively depicting an occupant side panel, a vehicle side panel, and a side panel of the airbag cushion of FIG. 8, the side panel being a combination of four fan shaped sub-panels.

FIGS. 13A, 13B, and 13C are diagrams respectively depicting an occupant side panel, a vehicle side panel, and one of a pair of side panels of the airbag cushion of FIGS. 12A and 12B.

FIG. 13D is of an enlarged view of a cloth grain of a center part of the side panel of FIG. 13C.

FIG. 14A is a diagram depicting the airbag cushion of FIGS. 12A and 12B as viewed from an occupant seated in the seat of FIG. 5.

FIG. 14B is a diagram of a side view of the airbag cushion of FIGS. 12A and 12B depicting the side panel of FIG. 13C.

FIG. 14C is a diagram of an enlarged view of a cloth grain of a center part of the side panel of FIG. 14B.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figures 1A, 1B:
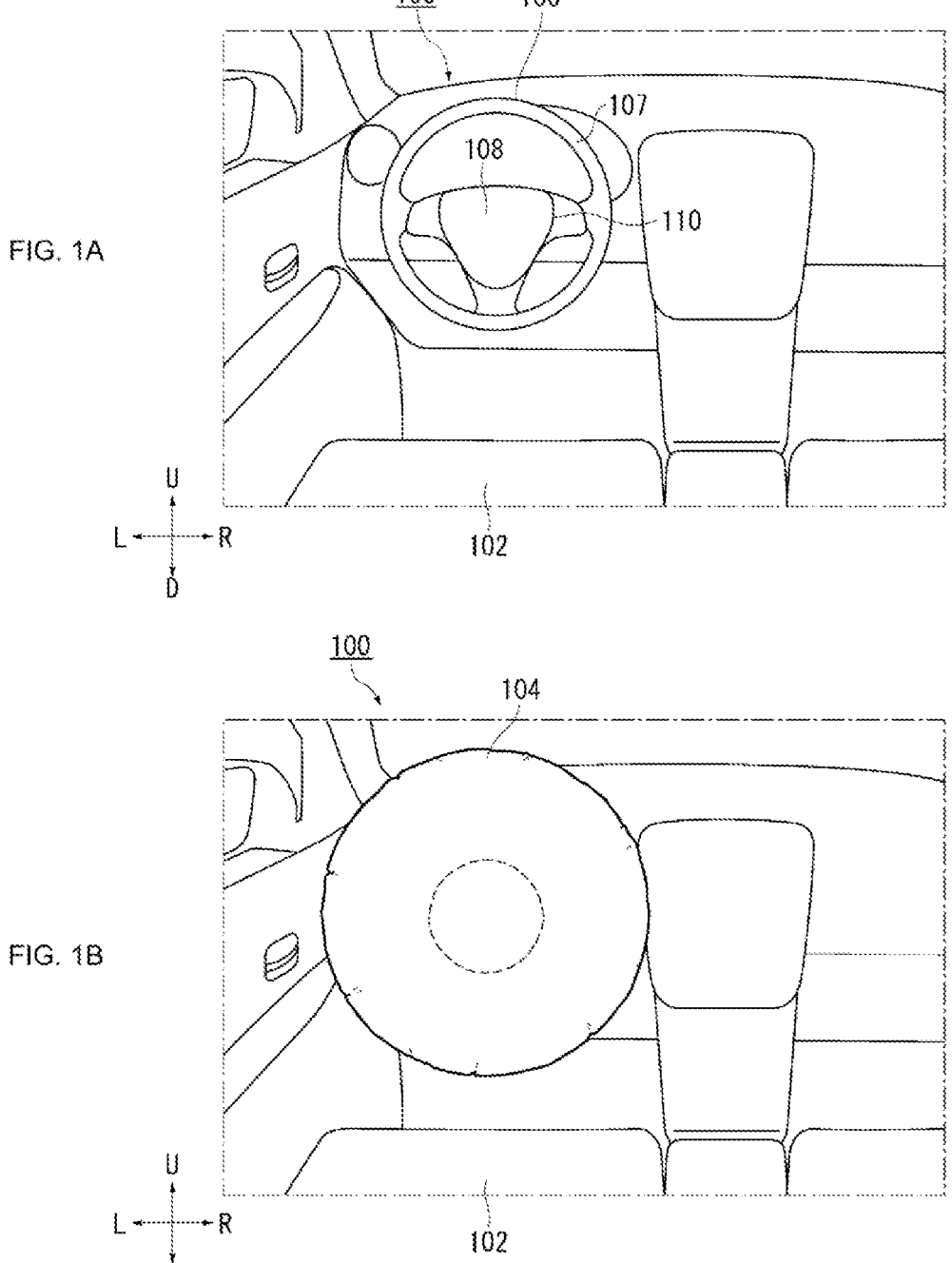
FIG. 1A is a diagram depicting the outline of a vehicle airbag device according to an embodiment of the present invention.
FIG. 1B is a diagram depicting an airbag cushion of the vehicle airbag device of FIG. 1A.

FIGS. 1A and 1B are diagrams depicting the outline of a vehicle airbag device 100 according to an embodiment of the present invention. FIG. 1A is a diagram depicting a state of the vehicle airbag device 100 before activation. Hereinafter, regarding FIG. 1A and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The vehicle airbag device 100 is applied in the present embodiment as the driver airbag for the driver's seat for vehicles with a steering wheel on the left side (front row left side seat 102). Hereinafter, descriptions are made assuming the front row left side seat 102, for example, a vehicle outer side in the vehicle width direction (hereinafter, vehicle outer side) refers to a left side of the vehicle, and an inner side in the vehicle width direction (hereinafter, vehicle inner side) refers to a right side of the vehicle. In addition, with regard to the present embodiment, a forward direction is described as "front" and a rear direction is described as "rear" as viewed from an occupant properly seated in the seat 102. Similarly, the right hand direction of a normally seated occupant is described as "right" while the left hand direction is described as "left". Furthermore, with regard to the center of the occupant's body at this time, the direction toward the head is "up" while the direction toward the legs is "down."

An airbag cushion 104 (see FIG. 1B) of the vehicle airbag device 100 is a member that protects the occupant of the seat 102, in other words, the driver, from contacting a steering wheel 106 and the like, and structural items of the vehicle, in an emergency. The airbag cushion 104 is stowed in a hub 108 in a folded or rolled state in the center of the steering wheel 106 in front of the sitting position of the seat 102. The hub 108 includes a housing (not shown) for stowing the airbag cushion 104 and a cover 110 and the like. An inflator 112 (see FIG. 2A) is also stowed inside the hub 108 together with the airbag cushion 104.

FIG. 1B is a diagram depicting a state of the vehicle airbag device 100 at activation. The airbag cushion 104 is a bag shaped structure and gas pressure from the inflator 112 (see FIG. 2A) that cleaves the cover 110 (see FIG. 1A), causes expansion and deployment thereof between the steering wheel 106 and seat 102. The airbag cushion 104 has a circular shape as seen from the seating position side, and is formed with a plurality of panels that make up the surface and are layered through sewing or adhesion.

Figure 2A:
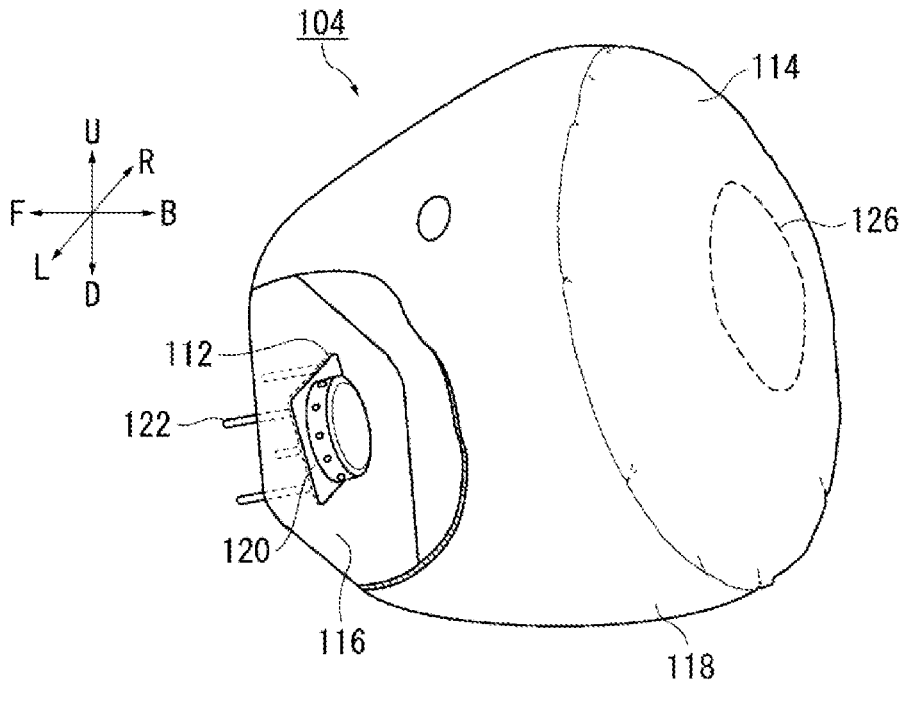
FIG. 2A is a diagram of the airbag cushion of FIG. 1B from an alternate direction.
Figure 2B:
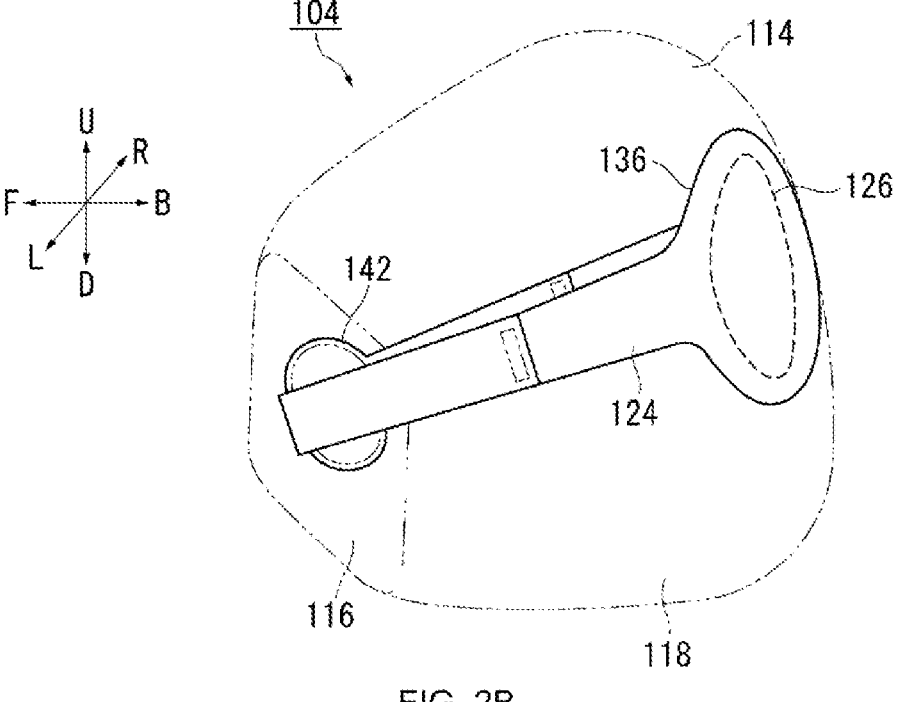
FIG. 2B is a diagram of an outline of the airbag cushion of FIG. 1B and depicting an internal tether of the airbag cushion.

FIGS. 2A and 2B are diagrams depicting the airbag cushion 104 of FIG. 1B as viewed from various directions. FIG. 2A is a diagram depicting the airbag cushion 104 of FIG. 1B viewed from slightly above the exterior of the vehicle. In FIG. 2A, a portion of the panel configuring the airbag cushion 104 is cut out to expose the internal inflator 112.

The airbag cushion 104 is formed from a plurality of panels. An occupant side panel 114 is a panel that deploys on the occupant side and restrains the occupant and is also called a front panel due to being positioned in front as viewed from the occupant. A vehicle side panel 116 is a panel positioned on the side opposite that of the occupant side panel 114 that is the steering wheel 106 side (see FIG. 1A) and is also called a rear panel due to being positioned farther away from the occupant. A side panel 118 is a panel for connecting the occupant side panel 114 and the vehicle side panel 116 and constitutes the side surface of the airbag cushion 104.

The inflator 112 is a device for supplying gas, and in the present embodiment, a disk type is used. A portion of the inflator 112 formed as a gas discharge opening 120 is inserted into the airbag cushion 104 through the vehicle side panel 116 and the inflator is activated by a signal sent from a sensor (not depicted) in an emergency and supplies gas to the airbag cushion 104.

The inflator 112 is provided with a plurality of stud bolts 122. The stud bolts 122 pass through the vehicle side panel 116 of the airbag cushion 104 and fasten inside the hub 108 of the steering wheel 106 (see FIG. 1A) described above.

The airbag cushion is also secured inside the hub 108 by fastening of the stud bolts 122.

Examples of currently prevailing inflators include: types filled with a gas generating agent and that burn the agent to generate a gas; types filled with a compressed gas which supply the gas without generating heat; hybrid types that utilize both a combustion gas and a compressed gas; and the like. Any type of inflator can be used as the inflator 112.

FIG. 2B is a diagram depicting the internal structure of the airbag cushion 104 of FIG. 2(a) through each panel. The airbag cushion 104 is provided with an internal tether 124 inside the bag shaped panel. The internal tether 124 is a member that spans between the occupant side panel 114 and the vehicle side panel 116. The internal tether 124 pulls the occupant side panel 114 toward the vehicle side panel 116 during expansion and deployment of the airbag cushion 104; thereby controlling the behavior and shape of the airbag cushion 104.

Figures 3A, 3B:
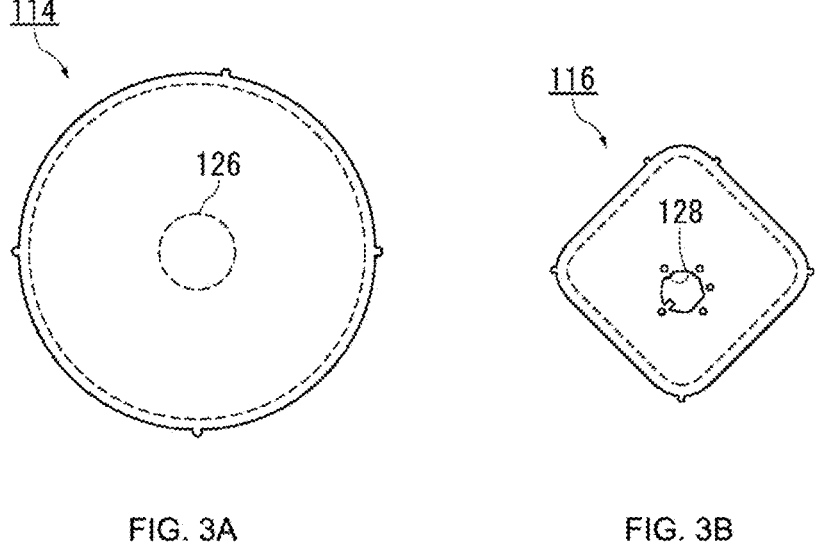
FIGS. 3A, 3B, and 3C are diagrams respectively depicting an occupant side panel, a vehicle side panel, and a side panel of the airbag cushion of FIGS. 1B, 2A, and 2B, the side panel including two trapezoidal sub-panels.
Figure 3C:
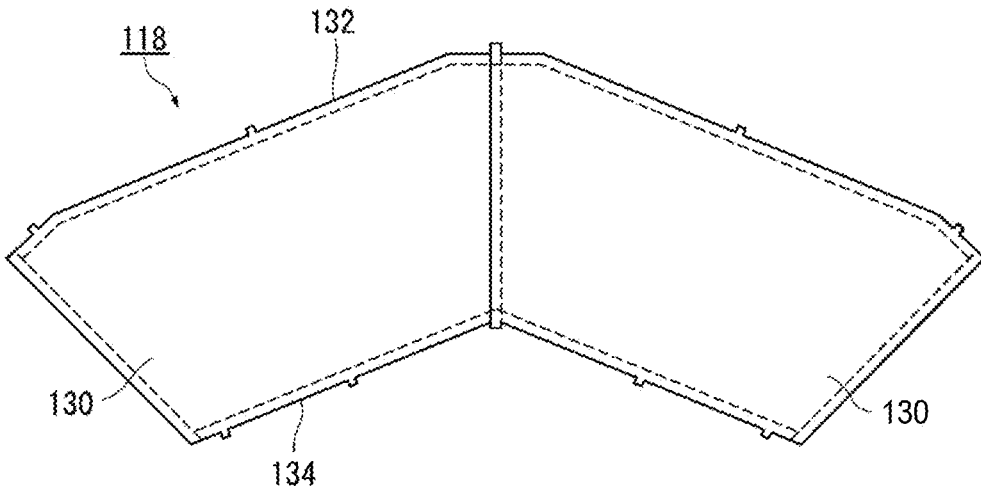

FIGS. 3A, 3B, and 3C are diagrams depicting each panel configuring the airbag cushion 104 in FIG. 2A. In FIGS. 3A, 3B, and 3C, each panel is illustrated in a state spread out on a plane. FIG. 3A is a diagram depicting the occupant side panel 114 of FIG. 2A. The occupant side panel 114 is circular and serves as an occupant restraining surface that restrains the occupant during expansion and deployment of the airbag cushion 104. There is a seam 126 that is a joint with the internal tether 124 (see FIG. 2B) present in the center of the occupant side panel 114.

FIG. 3B is a diagram depicting the vehicle side panel 116 of FIG. 2B. The vehicle side panel 116 is square and functions as a reaction force surface that receives a reaction force from the steering wheel 106 (see FIG. 1A) during expansion and deployment of the airbag cushion 104 (see FIG. 1B). The vehicle side panel 116 is configured with a surface area that is narrower than that of the occupant side panel 114 (see FIG. 3A) such that the airbag cushion 104 expands and deploys with a widened shape towards the occupant. A securing region 128, in which the inflator 112 (see FIG. 2A) is inserted and secured inside the hub 108, is formed in the center of the vehicle side panel 116.

FIG. 3C is a diagram depicting the side panel 118 of FIG. 2B. The side panel 118 is composed of two trapezoidal sub-panels 130 with the side edges thereof joined together. For the sub-panel 130, a long side 132, corresponding to a lower base of the trapezoid, is sewn to the edge of the occupant side panel 114 (see FIG. 3A) and a short side 134, corresponding to the upper base, is sewn to the edge of the vehicle side panel 116 (see FIG. 3B).

Figure 4A:
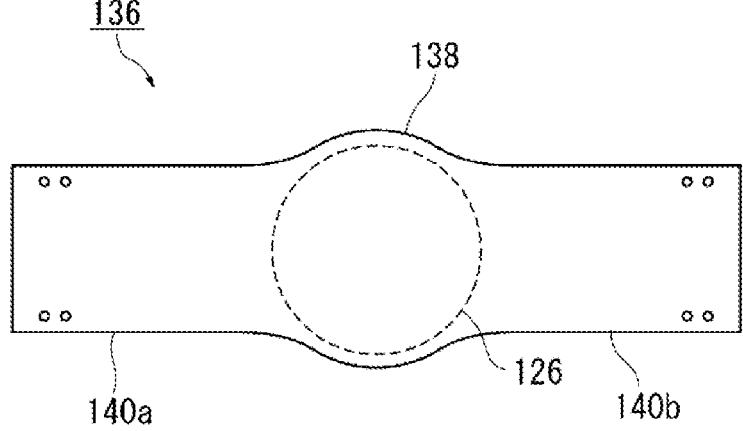
FIGS. 4A and 4B are diagrams depicting the internal tether of FIG. 2B.
Figure 4B:
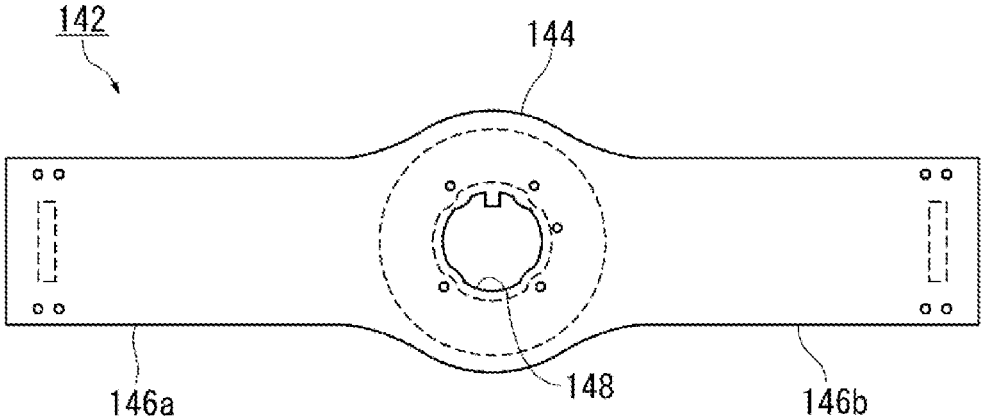

FIG. 4 is a diagram depicting each component configuring the internal tether 124 of FIG. 2B. FIG. 4A is a diagram depicting a first component 136 of the internal tether 124 spread out on a flat surface. The first component 136 includes a circular center part 138 and tether parts 140a and 140b extending from both left and right edges of a center part 138. The center part 138 is connected to the inside of the occupant side panel 114 by a circular seam 126. Tether parts 140a and 140b extend from both left and right edges of the center part 138 toward the vehicle side panel 116 and connect to a second component 142 (see FIG. 4B).

FIG. 4B depicts the second component 142 of the internal tether 124 spread out on a flat surface. The second component 142 is also provided with a circular center part 144 and tether parts 146a and 146b that extend from both left and right edges of the center part 144. The center part 144 has a securing region 148 the inflator 112 is inserted into (see FIG. 2A) that is overlaid on the inside of the vehicle side panel 116 and the inflator 112 is inserted and secured together with the vehicle side panel 116 inside the hub 108 (see FIG. 1A). The tether parts 146*a* and 146*b* extend from both left and right edges of the center part 144 toward the occupant side panel 114 and are connected to the tether parts 140*a* and 140*b* of the first component 136 (see FIG. 4A).

The internal tether 124 that is composed of the first component 136 and the second component 142 (see FIG. 2B) is tensioned when the airbag cushion 104 expands and deploys and has a dimension so as to pull the occupant side panel 114 toward the vehicle side panel 116. With the internal tether 124, oscillation of the airbag cushion 104 is suppressed and shape of the occupant side panel 114 is changed, enabling raising occupant restraining force and suppressing injury value.

Figure 5:
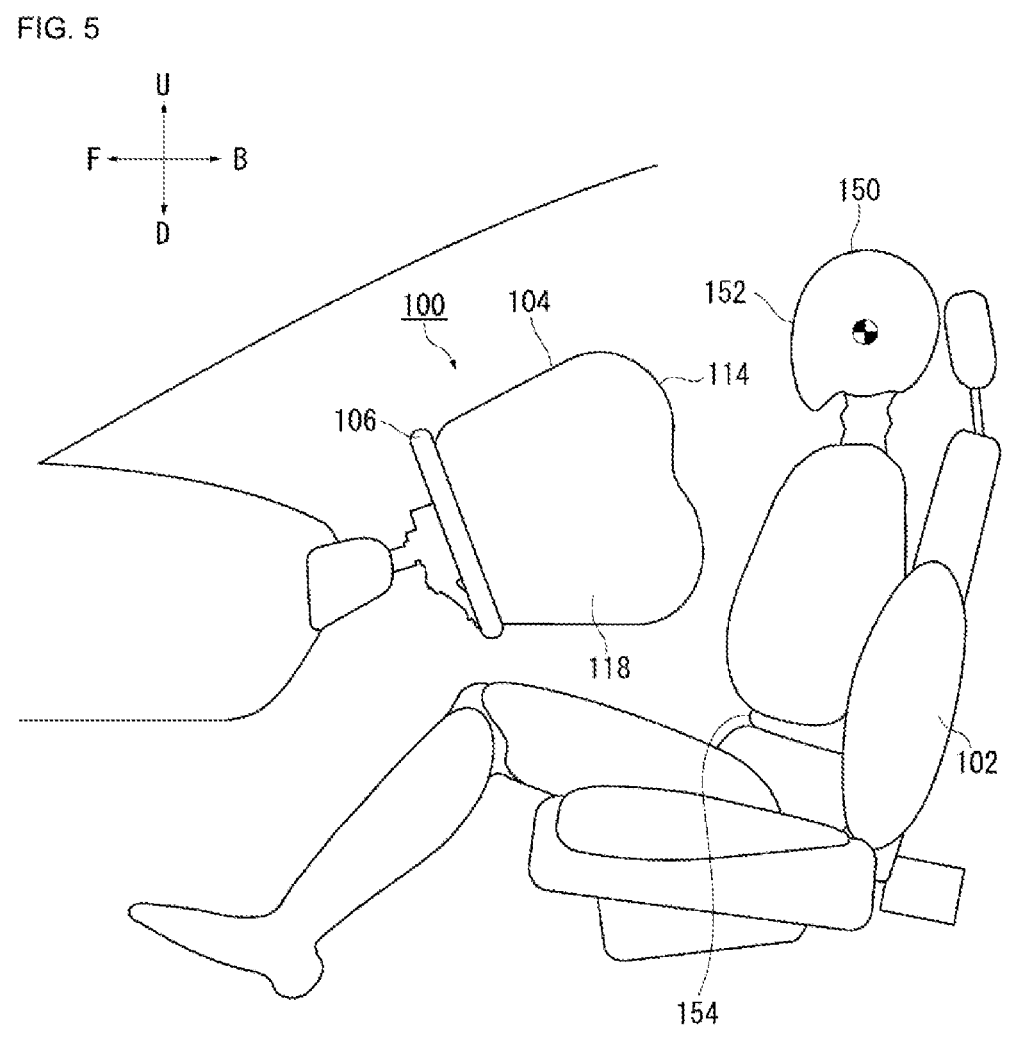

FIG. 5 is a diagram depicting the airbag cushion 104 in FIG. 1B and an occupant 150 seated in a seat 102. FIG. 5 depicts the airbag cushion 104 and occupant 150 as viewed from the left side in the vehicle width direction.

Upon impact to the vehicle in an emergency causing the occupant 150 to attempt to move to the front of the vehicle due to inertia, there is danger of coming into contact with the steering wheel 106. Here, with the vehicle airbag device 100, when the sensor senses the vehicle impact or detects that the vehicle is in danger, the airbag cushion 104 is expanded and deployed from the steering wheel 106 and restrains the occupant 150 who is attempting to move toward the front of the vehicle. In this manner, the airbag cushion 104 enters the space between the steering wheel 106 and the occupant 150 enabling protecting portions where injury values readily rise such as the head 152 and the abdomen 154.

Figure 6A:
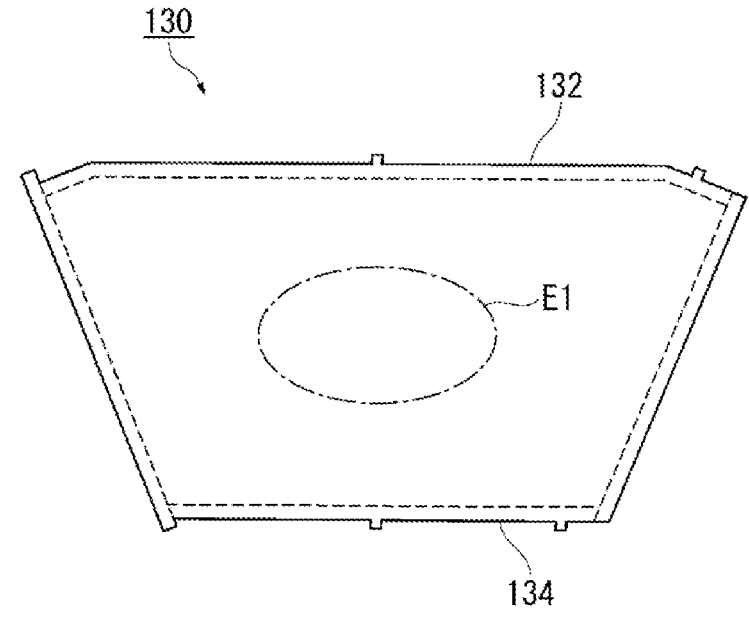
FIG. 6A is a diagram depicting one of the trapezoidal sub-panels of FIG. 3C.
Figure 6B:
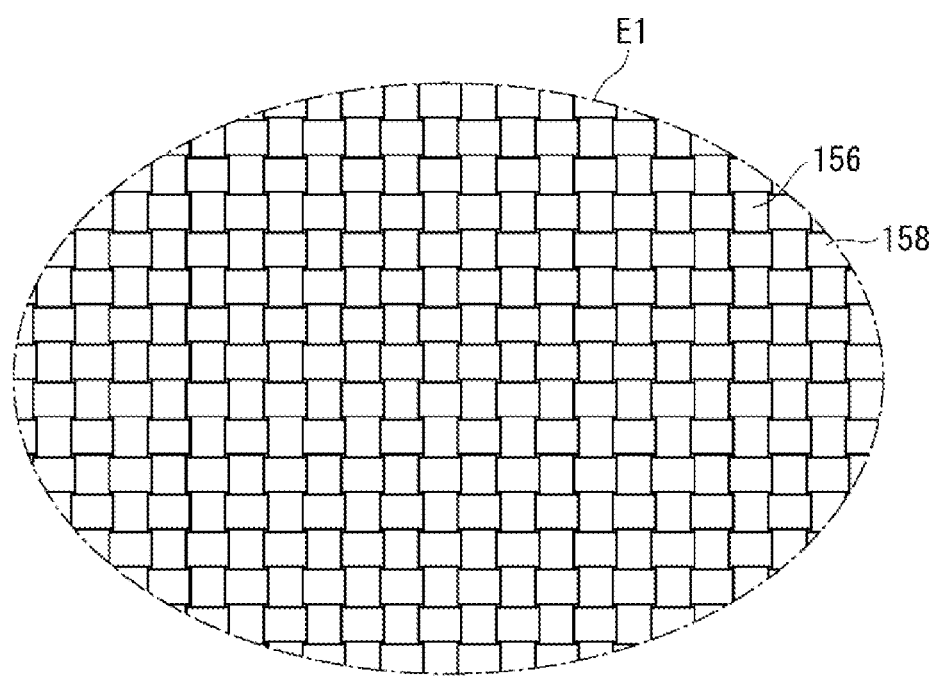
FIG. 6B is a diagram depicting an enlarged view of a cloth grain of the trapezoidal sub-panel of FIG. 6A.

FIGS. 6A and 6B are diagrams depicting the sub-panel 130 in FIG. 3C. FIG. 6A depicts a state of the sub-panel 130 being placed on a flat surface. The sub-panel 130 uses the same base material as the occupant side panel 114 and the like and is formed in a trapezoidal shape. The sub-panel 130 forms a part of the side panel 118 with a lower base that is longer than an upper base on the occupant side panel 114 side (see FIG. 2A and the like) and the lower base [sic] on the vehicle side panel 116 side.

FIG. 6B is an enlarged view of cloth grain of a center part E1 of the sub-panel 130 of FIG. 6A. The center part E1 is a region including the center of the sub-panel 130 and at least does not include the area close to a long side 134 connected to the occupant side panel 114 (see FIG. 3A) or the area close to a short side 136 connected to the vehicle side panel 116 (see FIG. 3B). As depicted in FIG. 6B, the base fabric forming the sub-panel 130 is made of warp 156 and weft 158 yarn woven together.

Figures 7A, 7B, 7C, 7D, 7E:
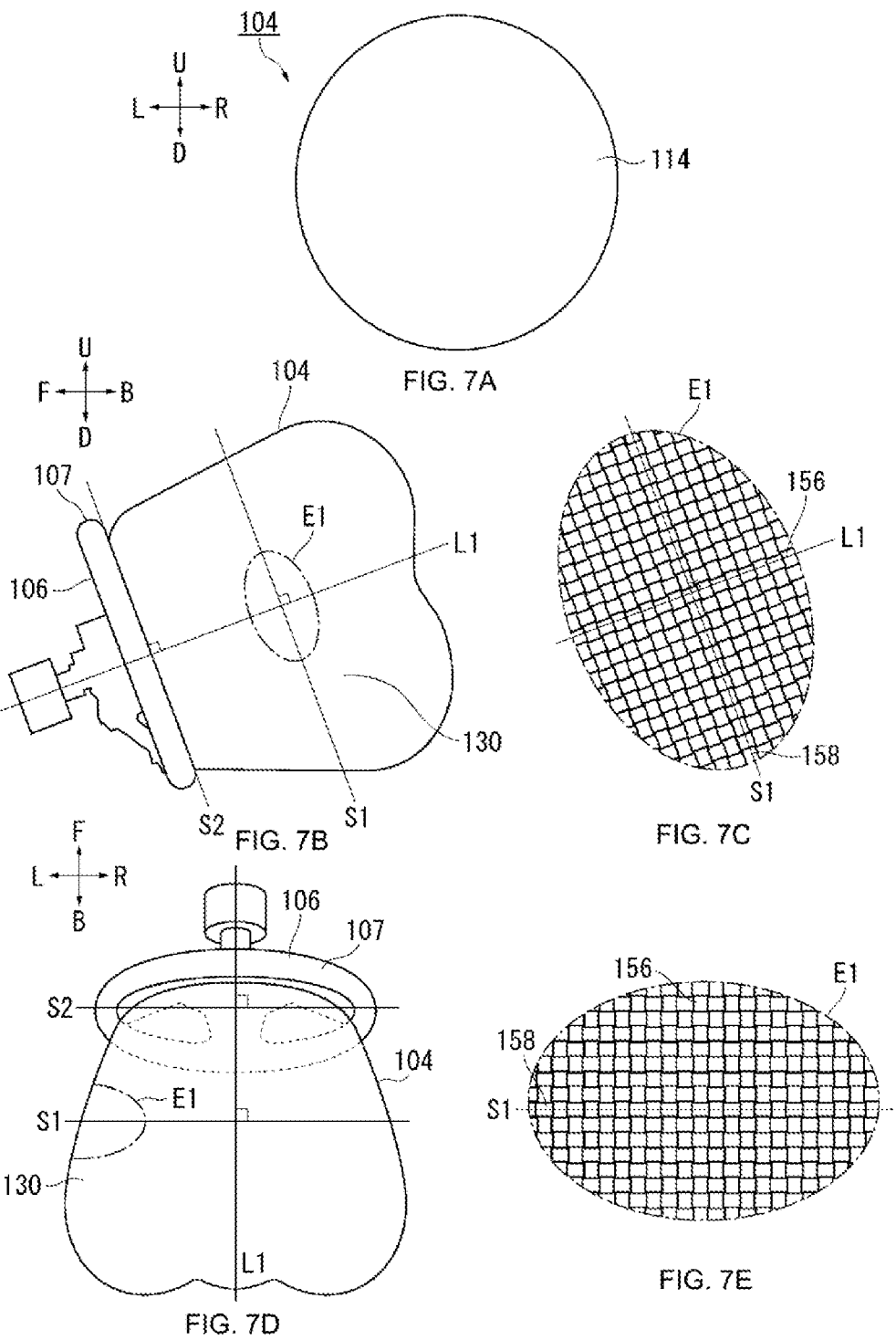
FIG. 7A is a diagram depicting the airbag cushion of FIG. 1B as viewed from an occupant seated in the seat of FIG. 5.
FIG. 7B is a diagram of a side view of the airbag cushion of FIG. 1B depicting one of the trapezoidal sub-panels of FIG. 3C.
FIG. 7C is a diagram of an enlarged view of a cloth grain of a center part of the sub-panel of FIG. 7B.
FIG. 7D is a diagram of the airbag cushion of FIG. 1B viewed from above.
FIG. 7E is a diagram of an enlarged view of a cloth grain of a center part of the sub-panel of FIGS. 7B and 7D.

FIGS. 7A, 7B, and 7C are diagrams depicting the airbag cushion 104 of FIG. 1B as viewed from various directions. FIG. 7A is a diagram depicting the airbag cushion 104 as viewed from the occupant 150 properly sitting in the seat 102 (see FIG. 5). Properly sitting is the state of being seated correctly, without any postural deviation, in relation to the seat 102. As viewed from an occupant 150 that is sitting properly, the airbag cushion 104 is in a state with the occupant side panel 114 in a substantially circular contour facing the occupant.

FIG. 7B is a diagram depicting the airbag cushion 104 of FIG. 1B as viewed from the left side in the vehicle width direction. Line segment L1 depicted in FIG. 7B is the center axis of the expanded and deployed airbag cushion 104 and is a line segment that extends orthogonal to a virtual plane S2 along the occupant side of a rim 107 of the steering wheel 106 and passing through the center of rotation of the steering wheel 106. Plane S1 is a virtual plane perpendicular to this line segment L1 and is a plane that is parallel to the plane S2 described above. Plane S2 is a virtual plane spreading in contact on the occupant side of the rim 107 of the steering wheel 106 and functions as a supporting surface of the vehicle side panel 116 (see FIG. 2A) of the expanded and deployed airbag cushion 104. When the occupant is restrained, the airbag cushion 104 restrains the occupant while gaining a reaction force from the rim 107 along the plane S2.

FIG. 7C is an enlarged view of cloth grain of a center part E1 of the sub-panel 130 of FIG. 7B. With the present embodiment, with the sub-panel 130, the weft 158 of the center part E1 extends into the plane S1. In other words, each of the weft 158 threads is formed aligned parallel with the plane S1. Furthermore, the warp 156 that is a second thread constituting the sub-panel 130 extends in a direction orthogonal to the weft 158.

FIG. 7D is a diagram depicting the airbag cushion 104 in FIG. 1B, as viewed from above. As described above, the line segment L1 is a line segment that is orthogonal to the plane S2 and passes through the center of rotation of the steering wheel 106. Plane S1 is a plane orthogonal to line segment L1. Plane S2 is a virtual plane passing along the occupant side of the rim 107 of the steering wheel 106.

FIG. 7E is an enlarged view of cloth grain of a center part E1 of the sub-panel 130 of FIG. 7B. When viewed from above, the weft 158 threads of the sub-panel 130 center part E1 enter into the plane S1 and extend parallel to the plane S2 (see FIG. 7D).

The weft 158 threads extending into the plane S1 described above receive the force when the occupant 150 (see FIG. 5) in a proper sitting position comes into contact with the airbag cushion 104 with the rim 107 of the steering wheel 106 in a direction that is orthogonal with the weft 158 threads to the extent possible.

With the configuration described above, aligning the direction of the cloth grains of each sub-panel 130 and 132 (see FIG. 3C) enables evenly distributing the force on each sub-panel 130 and 132 when the airbag cushion 104 expands (see FIG. 5) and the force received when restraining the occupant 150, to the extent possible. Therefore, deviation of the reaction force applied to the occupant 150 from the occupant side panel 114 can be suppressed which, for example, suppresses application of an unintentional rotational force to the head 152 of the occupant 150; thereby reducing the injury value of the occupant 150.

As described above, with the present embodiment, the weft 158 of the center part E1 of the sub-panel 130 (see FIG. 7C), extends into the plane S1 and also extends parallel relative to the virtual plane S2 (see FIG. 7B) along the occupant side of the rim 107 of the steering wheel 106. In this regard, in another example, the airbag cushion 104 can have a configuration where the weft 158 threads of each sub-panel 130 and 132 are configured extending parallel only to the plane S2 rather than referencing both the plane S1 and the plane S2. With this configuration as well, by aligning the direction of the cloth grains of each sub-panel 130 and 132 with reference to the steering wheel 106, force primarily transferred from the steering wheel 106 side during expansion and during occupant restraint can be distributed evenly over each sub-panel 130 and 132 to the extent possible. Therefore, deviation of the reaction force applied to the occupant 150 from the occupant side panel 114 can be suppressed; preventing a force in the rotational direction of the head 152 of the occupant 150 and reducing injury value of the occupant 150.

First Modified Example

Modified examples of each component of the vehicle airbag device 100 described above will be described below. In each of the modified examples below, the same components as those already described are omitted from the description by labeling the components with the same symbol. Furthermore, the same names as the components described above shall have the same functions unless otherwise indicated even when labeled with a different symbol.

Figure 8:
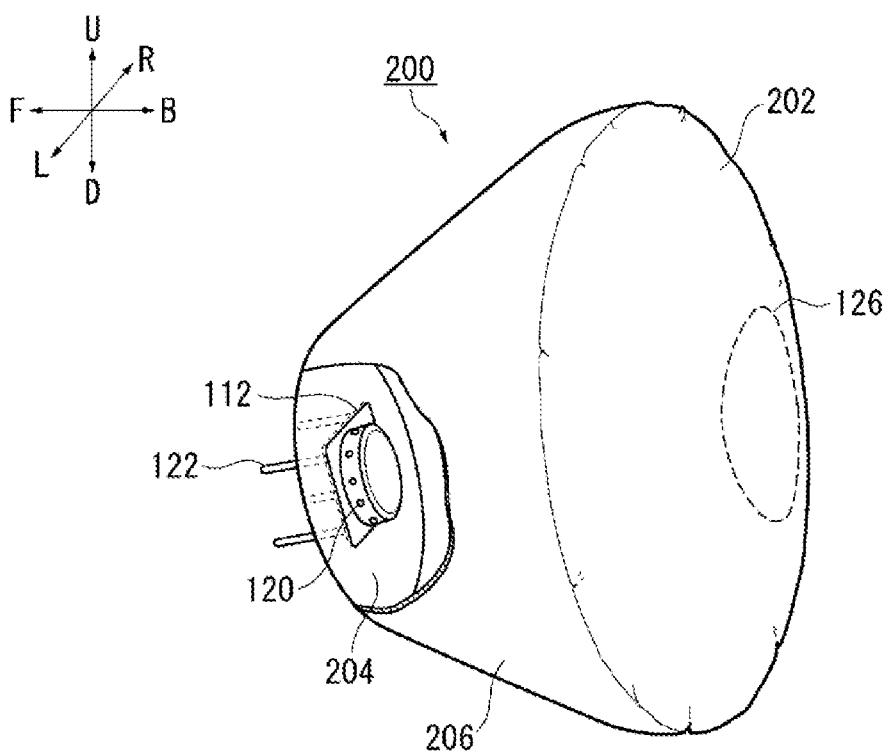
FIG. 8 is a diagram depicting a first modified example of the airbag cushion of FIG. 2A.

FIG. 8 is a diagram depicting a first modified example (airbag cushion 200) of the airbag cushion 104 of FIG. 2A. The airbag cushion 200 also includes an occupant side panel 202, a vehicle side panel 204, and side panel 206. The configuration of the airbag cushion 200 differs with the configuration of the airbag cushion 200 of FIG. 2A in terms of the shape of the sub-panels 212 (see FIG. 9C) that constitute the side panel 206.

Figure 9C:
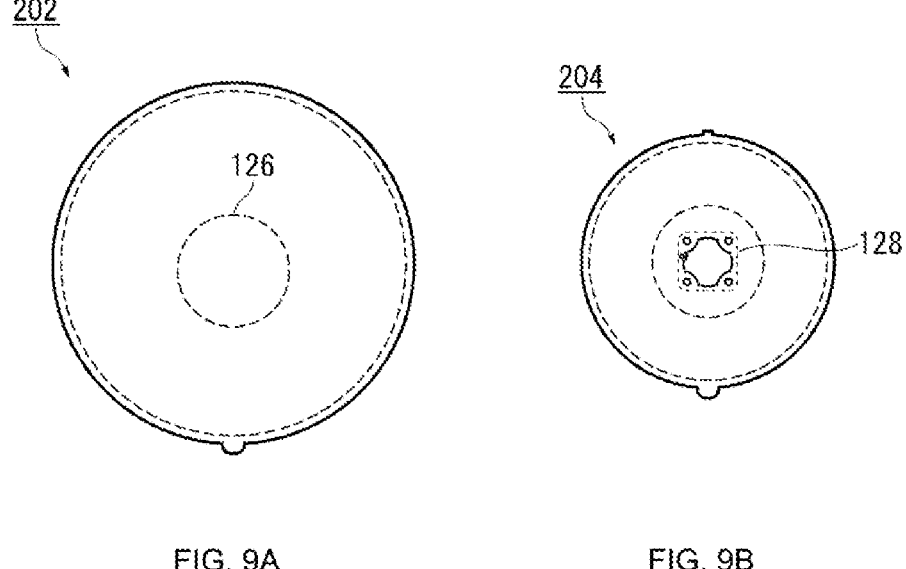
Figure 9C:
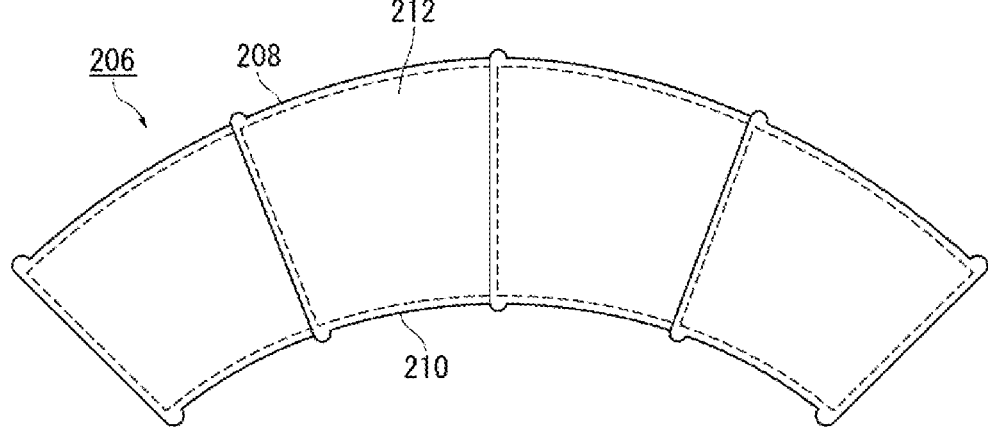

FIGS. 9A, 9B, and 9C are diagrams depicting each panel configuring the airbag cushion 200 in FIG. 8. In FIGS. 9A, 9B, and 9C, each panel is depicted in a state spread out on a flat surface. FIG. 9A is a diagram depicting the occupant side panel 202 of FIG. 8. The occupant side panel 202 is circular and there is a seam 126 with an internal tether 124 (see FIG. 2B) in the center.

FIG. 9B is a diagram depicting the vehicle side panel 204 of FIG. 8. The vehicle side panel 204 is a circle with a smaller surface area than that of the occupant side panel and a securing region 128 into which the inflator 112 is inserted (see FIG. 2A) is formed in a center thereof.

FIG. 9C is a diagram depicting the side panel 206 of FIG. 8. The side panel 206 has an arcuate strip shape in a state spread out on a plane. Regarding the side panel 206, a large diameter arc 208 is sewn to an edge of the occupant side panel 202 (see FIG. 9A) and a small diameter arc 210 is sewn to an edge of the vehicle side panel 204 (see FIG. 9B). The side panel 206 is a combination of four fan shaped sub-panels 212.

Figure 10A:
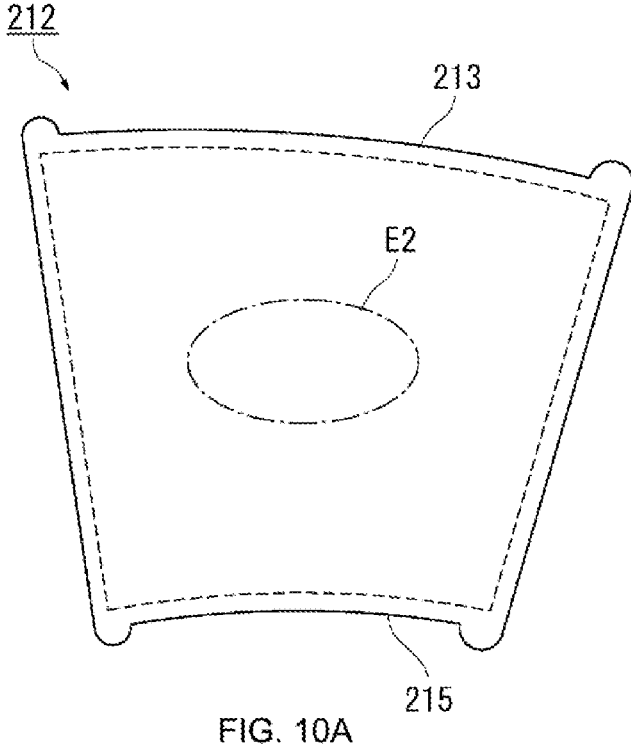
FIG. 10A is a diagram depicting one of the fan shaped sub-panels of FIG. 9C.
Figure 10B:
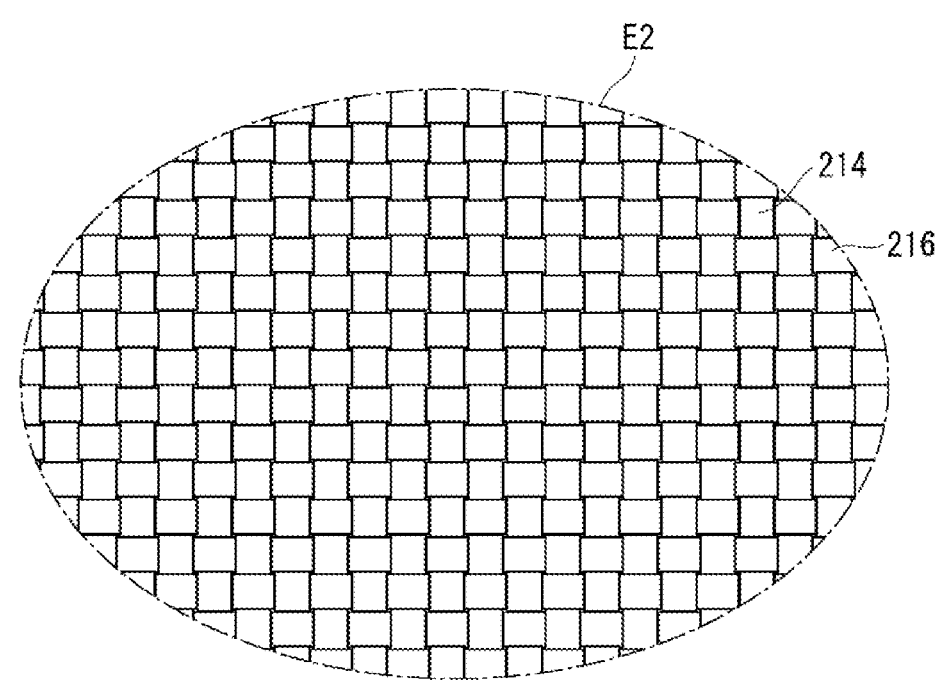
FIG. 10B is a diagram of an enlarged view of a cloth grain of a center part of the fan shaped sub-panel of FIG. 10A.

FIGS. 10A and 10B are diagrams depicting the sub-panels 212 of FIG. 9C. FIG. 10A depicts a state of the sub-panels 212 being placed on a flat surface. The sub-panels 212 use the same base material as the occupant side panel 202 and the like (see FIG. 9A) and form an arcuate fan shape with a large arc on the occupant side panel 202 side.

FIG. 10B is an enlarged view of cloth grain of a center part E2 of the sub-panels 212 of FIG. 10A. The center part E2 is a region including the center of the sub-panels 212 and at least does not include a region close to an arc 213 connecting with the occupant side panel 202 (see FIG. 9A) or a region close to an arc 215 connecting with the vehicle side panel 204 (see FIG. 9B). The sub-panels 212 are also configured from a base material having warp 214 thread and weft 216 thread.

Figures 11A, 11B, 11C, 11D, 11E:
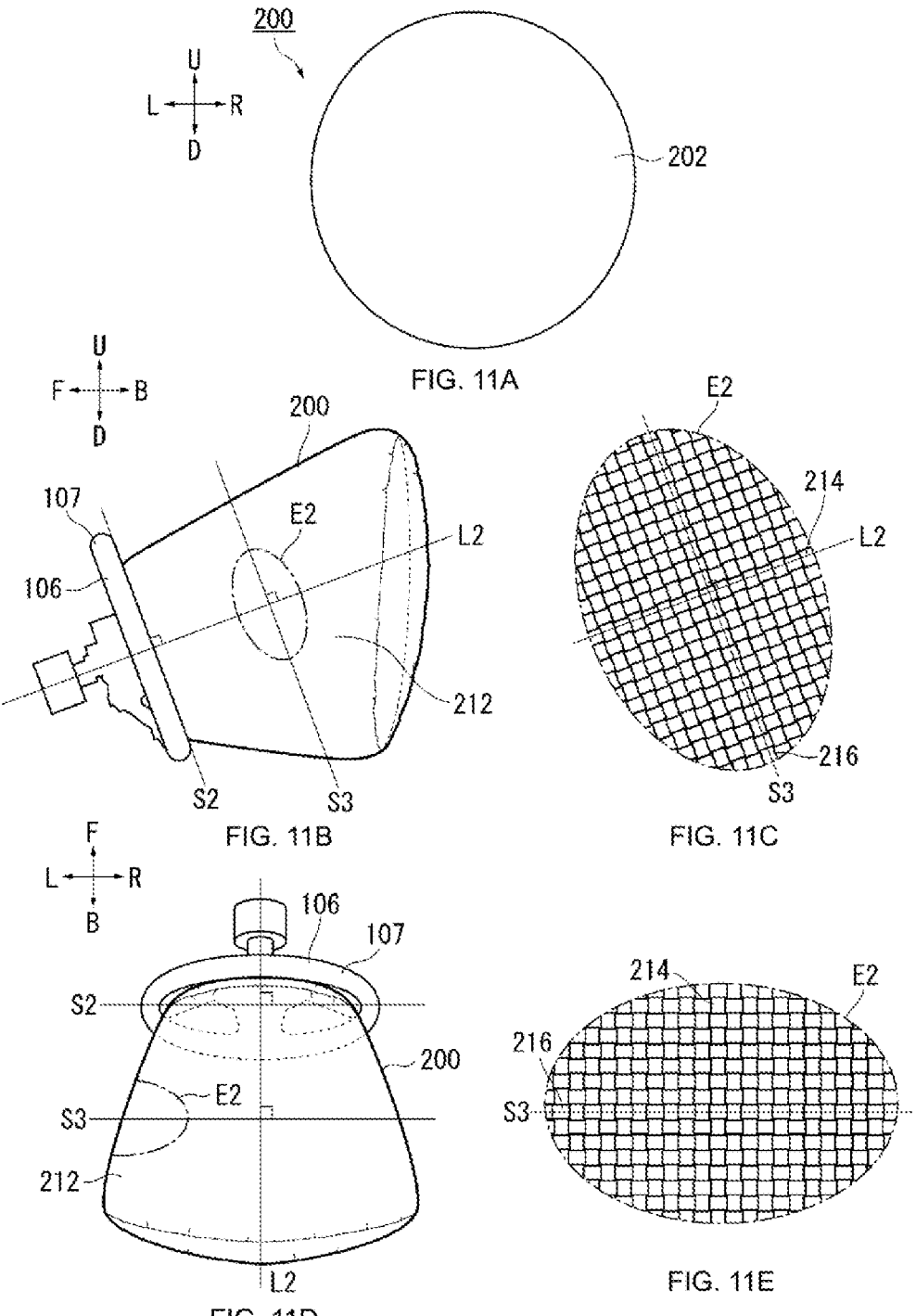
FIG. 11A is a diagram depicting the airbag cushion of FIG. 8 as viewed from an occupant seated in the seat of FIG. 5.
FIG. 11B is a diagram of a side view of the airbag cushion of FIG. 8 depicting one of the fan shaped sub-panels of FIG. 9C.
FIG. 11C is a diagram of an enlarged view of a cloth grain of a center part of the sub-panel of FIG. 11B.
FIG. 11D is a diagram of the airbag cushion of FIG. 8 viewed from above.
FIG. 11E is a diagram of an enlarged view of a cloth grain of a center part of the sub-panel of FIGS. 11B and 11D.

FIGS. 11A, 11B, 11C, 11D, and 11E are diagrams depicting the airbag cushion 200 of FIG. 8 as viewed from various directions. FIG. 11A is a diagram depicting the airbag cushion 200 as viewed from the occupant 150 properly sitting in the seat 102 (see FIG. 5). As viewed from an occupant 150 that is sitting properly, the airbag cushion 200 is in a state with the occupant side panel 202 in a substantially circular contour facing the occupant.

FIG. 11B is a diagram depicting the airbag cushion 200 of FIG. 8 as viewed from the left side in the vehicle width direction. Line segment L2 depicted in FIG. 11B is the center axis of the expanded and deployed airbag cushion 200 and is a line segment that extends orthogonal to a virtual plane S2 along the occupant side of the rim 107 of the steering wheel 106 and passes through the center of rotation of the steering wheel 106. Furthermore, plane S3 is a virtual plane perpendicular to the line segment L2. Plane S3 is a plane that is parallel to the virtual plane S2 along the occupant side of the rim 107 of the steering wheel 106 described above.

FIG. 11C is an enlarged view of cloth grain of a center part E2 of the sub-panels 212 of FIG. 11B. With the present embodiment, with the sub-panels 212, the weft 216 of the center part E2 extends into the plane S3. In other words, each of the weft 216 threads is formed aligned parallel with the plane S3. Furthermore, the warp 214 that is a second thread constituting the sub-panels 212 extends in a direction orthogonal to the weft 216.

FIG. 11D is a diagram depicting the airbag cushion 200 in FIG. 8, as viewed from above. As described above, the line segment L2 is a line segment that is orthogonal to the plane S2 and passes through the center of rotation of the steering wheel 106. Plane S3 is a plane orthogonal to line segment L2. In addition, plane S2 is a virtual plane passing along the occupant side of the rim 107 of the steering wheel 106.

FIG. 11E is an enlarged view of cloth grain of a center part E2 of the sub-panels 212 of FIG. 11B. When viewed from above, the weft 216 threads of the sub-panel 212 center part E2 enter into the plane S3 and extend parallel to the plane S2 (see FIG. 11D).

The weft 216 threads extending into the plane S3 described above receive the force when the occupant 150 (see FIG. 5) in a proper sitting position comes into contact with the airbag cushion 200 with the rim 107 of the steering wheel 106 in a direction that is orthogonal with the weft 216 threads to the extent possible.

With the configuration described above as well, aligning the direction of the cloth grains of each sub-panel 212 (see FIG. 9C) enables evenly distributing the force on each sub-panel 212 when the airbag cushion 200 expands (see FIG. 8) and the force received when restraining the occupant 150 (see FIG. 5), to the extent possible. Therefore, deviation of the reaction force applied to the occupant 150 from the occupant side panel 202 can be suppressed which, for example, suppresses application of an unintentional rotational force to the head 152 of the occupant 150; thereby enabling reducing injury value of the occupant 150.

The side panels 206 of FIG. 9C form the side surface of the airbag cushion 200 of FIG. 8 into an arcuate shape. Here, the four sub-panels 212 divide the arcuate side panel 206 into a plurality of fan shaped panels in the circumferential direction. This configuration also enables distributing the force for restraining the occupant 150 (see FIG. 5) and the like between each sub-panel 212 to the extent possible so deviation of the reaction force applied to the occupant 150 from the occupant side panel 202 is suppressed and injury value to the occupant 150 can be reduced.

For this modified example as well, in another example, the airbag cushion 200 can have a configuration where the weft 216 threads of each sub-panel 212 are configured extending parallel only to the plane S2 rather than referencing both the plane S3 (see FIG. 11B) and the plane S2. With this configuration as well, by aligning the direction of the cloth grains of each sub-panel 212 with reference to the steering wheel 106, force primarily transferred from the steering wheel 106 side during expansion and during occupant restraint can be distributed evenly over each sub-panel 212 to the extent possible. Therefore, deviation of the reaction force applied to the occupant 150 from the occupant side panel 202 can be suppressed; preventing a force in the rotational direction of the head 152 of the occupant 150 and reducing injury value of the occupant 150.

Second Modified Example

Figure 12A:
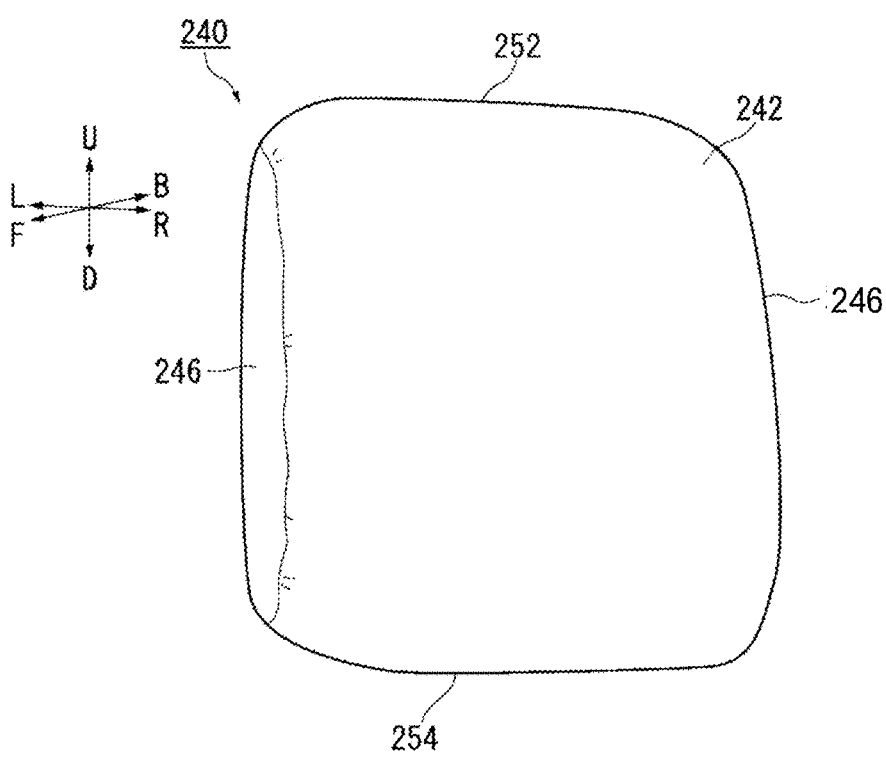
FIGS. 12A and 12B are diagrams depicting a second modified example of the airbag cushion of FIG. 2A.
Figure 12B:
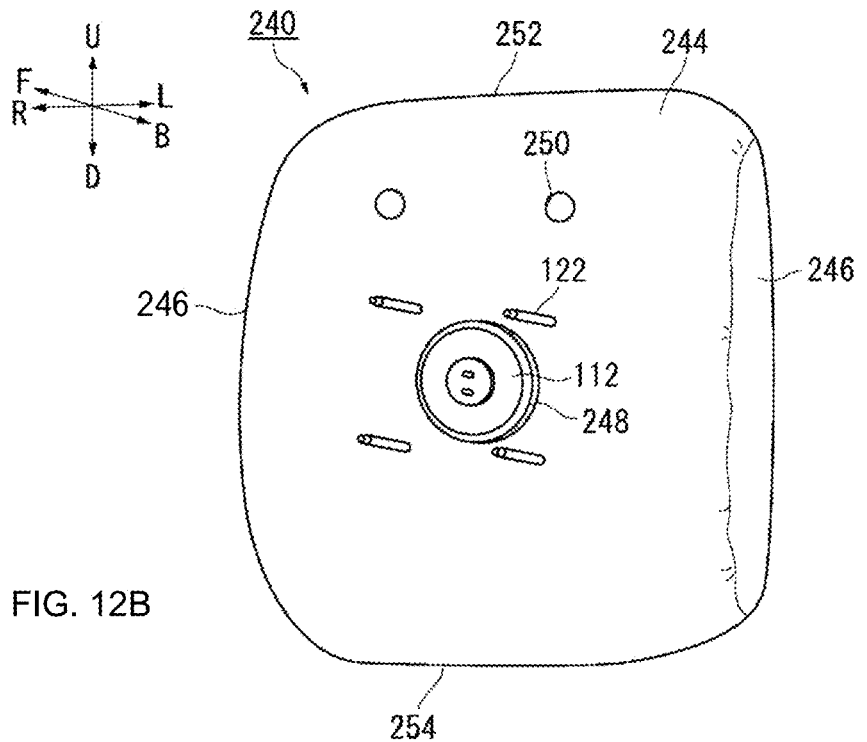

FIGS. 12A and 12B are diagrams depicting a second modified example (airbag cushion 240) of the airbag cushion 104 of FIG. 2A. FIG. 12A is a perspective view of the airbag cushion 240 as viewed from the occupant side. The airbag cushion 240 expands to an overall angular shape. The airbag cushion 240 also includes an occupant side panel 242, a vehicle side panel 244, and a pair of left and right sub-panels 246 that constitute a side panel.

FIG. 12B is a perspective view depicting the airbag cushion 240 in FIG. 12A as viewed from the front of the vehicle. The vehicle side panel 244 is provided with a securing region 248, in which the inflator 112 is inserted, and a vent hole 250 for discharging gas.

FIGS. 13A, 13B, 13C, and 13D are diagrams depicting each panel configuring the airbag cushion 240 in FIG. 12A. In FIGS. 13A, 13B, 13C, and 13D, each panel is depicted in a state spread out on a flat surface. FIG. 13A is a diagram depicting the occupant side panel 242 of FIG. 12A. The occupant side panel 242 is octagonal in shape.

FIG. 13B is a diagram depicting the vehicle side panel 244 of FIG. 12B. The vehicle side panel 244 is also octagonal in shape, includes the securing region 248 in which the inflator 112 is inserted (see FIG. 12B) formed in the center, and has two vent holes 250 formed thereabove.

FIG. 13C is a diagram depicting one of the sub-panels 246 of FIG. 12A. The sub-panels 246 of FIG. 12A have the same shape so hereinafter, sub-panel 246 will be included as an example. As a poly-sided shape having six or more sides, the sub-panel 246 is formed as a hexagon.

FIG. 13D is an enlarged view of cloth grain of a center part E3 of the sub-panel 246 of FIG. 13C. The center part E3 is a region including the center of the sub-panel 246 that at least does not include a region close to the edge of the sub-panel 246. The sub-panel 246 is also configured from a base material having warp 256 thread and weft 258 thread.

Of the side surfaces of the airbag cushion 240 (see FIG. 12A), the pair of left and right sub-panels 246 are arranged on left and right opposing surfaces as viewed from an occupant 150 sitting properly in the seat 102 (see FIG. 5). The upper part 252 and lower part 254 of the occupant side panel 242 and the vehicle side panel 244 at locations other than where the sub-panel 246 is provided are joined together directly.

FIGS. 14A, 14B, and 14C are diagrams depicting the airbag cushion 240 of FIG. 12A as viewed from various directions. FIG. 14A is a diagram depicting the airbag cushion 240 as viewed from the occupant 150 properly sitting in the seat 102 (see FIG. 5). As viewed from an occupant 150 that is sitting properly, the airbag cushion 240 is in a state with the occupant side panel 242 in a substantially square shape facing the occupant.

FIG. 14B is a diagram depicting the airbag cushion 240 of FIG. 12A as viewed from the left side in the vehicle width direction. Line segment L3 depicted in FIG. 14B is the center axis of the expanded and deployed airbag cushion 240 and is a line segment that extends orthogonal to a virtual plane S2 along the occupant side of the rim 107 of the steering wheel 106 and passes through the center of rotation of the steering wheel 106. Furthermore, plane S4 is a virtual plane perpendicular to the line segment L3. Plane S4 is a plane that is parallel to the virtual plane S2 along the occupant side of the rim 107 of the steering wheel 106 described above.

FIG. 14C is an enlarged view of cloth grain of a center part E3 of the sub-panel 246 of FIG. 12A. With the present embodiment, with the sub-panel 246, the warp 256 of the center part E3 extends into the plane S4. In other words, each of the warp 256 threads is formed aligned parallel with the plane S4. Furthermore, the weft 258 that is a second thread constituting the sub-panels 246 extends in a direction orthogonal to the warp 256.

The warp 256 threads extending into the plane S4 described above receive the force when the occupant 150 (see FIG. 5) in a proper sitting position comes into contact with the airbag cushion 104 with the rim 107 of the steering wheel 106 in a direction that is orthogonal with the warp 256 threads to the extent possible.

With the configuration described above as well, aligning the direction of the cloth grains of each of the sub-panels 246 and 248 (see FIG. 12A) enables evenly distributing the force on each of the sub-panels 246 and 248 when the airbag cushion 240 expands and the force received when restraining the occupant 150 (see FIG. 5), to the extent possible. Therefore, deviation of the reaction force applied to the occupant 150 from the occupant side panel 242 can be suppressed which, for example, suppresses application of an unintentional rotational force to the head 152 of the occupant 150; thereby enabling reducing injury value of the occupant 150.

As an additional modified example, the sub-panels 246 and 248 (FIG. 14B) can be provided as upper and lower opposing surfaces of the airbag cushion 240 as viewed from the occupant 150 properly sitting in the seat 102 (see FIG. 5). This configuration is a configuration of rotating the airbag cushion 240 of FIG. 12A 90 degrees to the left or to the right. This manner of configuration also enables distributing the force for restraining the occupant 150 between each of the sub-panels 246 and 248 to the extent possible so deviation of the reaction force applied to the occupant 150 from the occupant side panel 242 is suppressed and injury value to the occupant 150 can be reduced.

In addition, for this modified example as well, in another example, the airbag cushion 240 can have a configuration where the warp 256 threads of each of the sub-panels 246 and 248 are configured extending parallel only to the plane S2 rather than referencing both the plane S4 (see FIG. 14B) and the plane S2. With this configuration as well, by aligning the direction of the cloth grains of each of the sub-panels 246 and 248 with reference to the steering wheel 106, force primarily transferred from the steering wheel 106 side during expansion and during occupant restraint can be distributed evenly over each of the sub-panels 246 and 248 to the extent possible. Therefore, deviation of the reaction force applied to the occupant 150 from the occupant side panel 242 can be suppressed; preventing a force in the rotational direction of the head 152 of the occupant 150, and reducing injury value of the occupant 150.

The technical concepts of the vehicle airbag device 100 can be implemented as an airbag device provided adjacent to another seat in addition to the driver seat. For example, the airbag cushion 240 of FIG. 12A can be implemented as an airbag device for a passenger seat. In this case, the airbag cushion 240 can be installed in the instrument panel that is a structural object of the vehicle and expand and deploy between the instrument panel and occupant on the passenger seat. With this configuration, the occupant on the passenger seat is protected by the airbag cushion 240 from coming into contact with the instrument panel, and the force for restraining and the like of the occupant is distributed over the sub-panels 246 and 248; enabling reducing the injury value of the occupant.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as a vehicle airbag for restraining an occupant during an emergency.

EXPLANATION OF CODES

100. Vehicle airbag device, 102. Seat, 104. Airbag cushion, 106: Steering wheel, 107. Rim, 108. Hub, 110. Cover, 112. Inflator, 114. Occupant side panel, 116. Vehicle side panel, 118. Side panel, 120. Gas discharge opening, 122. Stud bolt, 124. Internal tether, 126. Seam, 128. Securing region, 130. Sub-panel, 132. Long side, 134. Short side, 136. First component, 138. Center part, 140a, 140b. Tether part, 142. Second component, 144. Center part, 146a, 146b. Tether part, 148. Securing region, 150. Occupant, 152. Head, 154. Abdomen, 156. Warp, 158. Weft, 200. Airbag cushion, 202. Occupant side panel, 204. Vehicle side panel, 206. Side panel, 208. Arc, 210. Arc, 212. Sub-panel, 213. Arc, 214. Warp, 215. Arc, 216. Weft, 240. Airbag cushion, 242. Occupant side panel, 244. Vehicle side panel, 246. Sub-panel, 248. Securing region, 250. Vent hole, 252. Upper part, 254. Lower part, 256. Warp, 258. Weft, E1. Center part, E2. Center part, E3. Center part, L1. Line segment, L2. Line segment, L3. Line segment, S1. Plane, S2. Plane, S3. Plane, S4. Plane.

The invention claimed is:

1. A vehicle airbag device comprising:

an inflator installed in a steering wheel of a vehicle; and an airbag cushion for receiving gas from the inflator to expand and deploy between the steering wheel and an occupant in a driver seat of the vehicle, wherein the airbag cushion includes:

an occupant side panel that deploys on an occupant side of the steering wheel for restraining the occupant, a vehicle side panel installed on a vehicle side of the steering wheel opposite the occupant side panel when deployed, and a third side panel that connects the occupant side panel and the vehicle side panel and constitutes a side surface of the airbag cushion when deployed, wherein the third side panel includes a plurality of sub-panels combined, the plurality of sub-panels together defining an entire outer circumference of the airbag cushion and being joined together by seams that each extend along overlapping edges of adjacent sub-panels from the vehicle side panel adjacent the steering wheel to the occupant side panel, each of the plurality of sub-panels having a trapezoidal shape with a short side and a long side longer than the short side, and each of the plurality of sub-panels having a central region in a center thereof made of fabric, the central region of each of the plurality of sub-panels being equidistant from the occupant side panel and the vehicle side panel and being equidistant from a first side edge and an opposite second side edge thereof, the first side edge and the second side edge extending from the vehicle side panel to the occupant side panel, wherein the fabric forming the central region of each of the plurality of sub-panels is made of a warp yarn and a weft yarn woven together, wherein the warp yarn extends in a direction orthogonal to a direction of the weft yarn, and wherein each individual weft yarn in the fabric forming the central region of each of the plurality of sub-panels extends along the outer circumference of the airbag cushion at a constant distance from a virtual plane defined by an occupant side of a rim of the steering wheel and parallel to the virtual plane defined by the occupant side of the rim of the steering wheel during expansion and deployment of the airbag cushion.

2. The vehicle airbag device according to claim 1, wherein the plurality of sub-panels consist of two trapezoidal sub-panels joined together by first and second seams extending from the vehicle side panel to the occupant side panel, wherein each of the two trapezoidal sub-panels has a short side and a long side longer than the short side, and wherein each short side is connected to the vehicle side panel and each long side is connected to the occupant side panel.

3. The vehicle airbag device according to claim 2, wherein the two trapezoidal sub-panels are arranged at facing locations of the side surface of the airbag cushion.

4. The vehicle airbag device according to claim 3, wherein the two trapezoidal sub-panels are provided facing each other on opposite sides of the airbag cushion as viewed from an occupant properly sitting in the driver seat.

5. The vehicle airbag device according to claim 1, wherein each short side is connected to the vehicle side panel and each long side is connected to the occupant side panel.

6. The vehicle airbag device according to claim 5, wherein the plurality of sub-panels include at least two sub-panels arranged at facing locations of the side surface of the airbag cushion.

7. The vehicle airbag device according to claim 6, wherein the at least two sub-panels are provided facing each other on opposite sides of the airbag cushion as viewed from an occupant properly sitting in the driver seat.

* * * * *